Nov. 27, 1956  E. B. MILLER  2,771,964
METHOD OF RECOVERING H₂S FROM NATURAL GAS
Filed April 13, 1953  9 Sheets-Sheet 1

FIG. 1.

INVENTOR
ERNEST B. MILLER
BY  *Adams & Bush*
ATTORNEYS

Nov. 27, 1956  E. B. MILLER  2,771,964
METHOD OF RECOVERING H$_2$S FROM NATURAL GAS
Filed April 13, 1953  9 Sheets-Sheet 2

INVENTOR
ERNEST B. MILLER

BY
ATTORNEYS

Nov. 27, 1956  E. B. MILLER  2,771,964
METHOD OF RECOVERING H$_2$S FROM NATURAL GAS
Filed April 13, 1953  9 Sheets-Sheet 5

INVENTOR
ERNEST B. MILLER
BY
ATTORNEYS

Nov. 27, 1956  E. B. MILLER  2,771,964
METHOD OF RECOVERING H$_2$S FROM NATURAL GAS
Filed April 13, 1953  9 Sheets-Sheet 6

INVENTOR
ERNEST B. MILLER
ATTORNEYS

Nov. 27, 1956  E. B. MILLER  2,771,964
METHOD OF RECOVERING H$_2$S FROM NATURAL GAS
Filed April 13, 1953  9 Sheets-Sheet 7

INVENTOR
ERNEST B. MILLER

BY
*Adams + Bush*
ATTORNEYS

Nov. 27, 1956  E. B. MILLER  2,771,964
METHOD OF RECOVERING H₂S FROM NATURAL GAS
Filed April 13, 1953  9 Sheets-Sheet 8

INVENTOR
ERNEST B. MILLER
BY Adams + Bush
ATTORNEYS

Nov. 27, 1956  E. B. MILLER  2,771,964
METHOD OF RECOVERING H₂S FROM NATURAL GAS
Filed April 13, 1953  9 Sheets-Sheet 9

FIG. 19

INVENTOR
ERNEST B. MILLER

BY

ATTORNEYS

United States Patent Office 2,771,964
Patented Nov. 27, 1956

2,771,964

METHOD OF RECOVERING H₂S FROM NATURAL GAS

Ernest B. Miller, Houston, Tex., assignor to Jefferson Lake Sulphur Company, New Orleans, La., a corporation of New Jersey Application April 13, 1953, Serial No. 348,304

8 Claims. (Cl. 183—114.2)

This invention relates to the recovery of sulphur from gases containing sulphur compounds and has more particular reference to a method of recovering elemental sulphur from natural gas.

One object of the present invention is to provide a novel method of removing and recovering constituents such as natural gasoline and elemental sulphur from raw natural gas containing H₂S.

Another object of the invention is to provide a novel method of recovering elemental sulphur from raw natural gas containing H₂S, wherein the H₂S content of the raw gas is removed therefrom by adsorption at high pressures and subsequently converted into elemental sulphur by an H₂S oxidant reaction in a reactor.

Another object of the invention is to provide a novel method of recovering elemental sulphur from raw natural gas, as characterized above, including the step of dehydrating the raw gas to remove all moisture and natural gasoline therefrom before the H₂S is adsorbed.

Another object of the invention is to provide a novel method of recovering elemental sulphur from raw natural gas, as characterized above, wherein the steps of removing water vapor and natural gasoline and of adsorbing the H₂S content from the gas are continuous steps and are accomplished with the gas under high pressure.

Another object of the invention is to provide a novel method of recovering elemental sulphur from raw natural gas, as characterized above, wherein the H₂S is removed from the natural gas, after it has been dehydrated, under high pressure in an adsorber in which at least one bed of adsorbent material is maintained in each of a plurality of zones, by continuously directing the flow of a hot activating medium, under high pressure, through at least one of said zones to remove the H₂S from the adsorbent material therein; continuously directing the flow of a purging medium through at least another one of said zones to purge the zone by removing all remaining activating gas and any remaining H₂S from the adsorbent material therein; continuously directing the flow of the dehydrated natural gas, under high pressure, through the remainder of said zones so that the contained H₂S will be adsorbed by the adsorbent material therein; and periodically shifting the relative positions of the particular adsorbent beds and the particular flow of fluids in each of said zones so that each zone becomes, in succession, a reactivation zone, a purging zone, and an adsorption zone.

Another object of the invention is to provide a novel method of recovering elemental sulphur from raw natural gas, as characterized above, wherein a portion of the flow of the effluent natural gas from the adsorber is continuously diverted for use as the purging medium and wherein the flow of the purging medium after its passage through the purging zone is continuously directed back into the flow of the natural gas on its way to the adsorber.

Another object of the invention is to provide a novel method of recovering elemental sulphur from raw natural gas, as characterized above, wherein the hot activating medium is H₂S and is continuously heated and recycled through the activation zone and wherein a portion of the recycled H₂S is continuously withdrawn from its recycling path for conversion into elemental sulphur.

A further and more limited object of the invention is to provide a novel method of removing and recovering H₂S from dry natural gas.

A still further and more limited object of the invention is to provide a novel method of removing and recovering moisture and condensable hydrocarbons from wet natural gas.

Other objects and advantages of the invention will appear in the specification when considered in connection with the accompanying drawings, in which.

In general, the present invention comprises a novel and improved method of recovering sulphur in concentrated form from natural gas and includes the steps of (1) removing the moisture and natural gasoline from the wet natural gas in a dehydrator in which at least one bed of adsorbent material is maintained in each of a plurality of zones by continuously directing the flow of a hot activating medium through at least one of said zones to remove the moisture and natural gasoline from the adsorbent material therein; continuously directing the flow of a purging medium through at least another one of said zones to remove any of the activating medium and/or remaining adsorbed products from the adsorbent material therein; continuously directing the flow of the gas being treated through the remainder of said zones so that the moisture and natural gasoline will be adsorbed by the adsorbent material therein; and periodically shifting the relative positions of the particular adsorbent beds and the particular flows of fluids in each of said zones so that each zone becomes, in succession, an activation zone, a purging zone and a dehydrating zone; (2) removing the H₂S from the now dehydrated gas in an adsorber in which at least one bed of adsorbent material is maintained in each of a plurality of zones; continuously directing the flow of a hot activating medium, under high pressure, through at least one of said zones to remove the adsorbed H₂S from the adsorbent material therein; continuously directing the flow of a purging medium under high pressure through at least another one of said zones to remove any of the activating medium and/or remaining adsorbed H₂S from the adsorbent material therein; continuously directing the flow of the now dry natural gas, under high pressure, through the remainder of said zones so that H₂S will be adsorbed by the adsorbent material therein; and periodically shifting the relative positions of the particular adsorbent beds and the particular flow of fluids in each of said zones so that each zone becomes, in succession, an activation zone, a purging zone, and an adsorbing zone; and (3) converting the recovered H₂S gas into elemental liquid sulphur in a converter in which at least one bed of catalyst material is maintained in each of a plurality of zones; continuously directing the flow of a hot oxidizing medium through at least one of said zones to reactivate the catalyst material therein; continuously directing the flow of the H₂S gas through the remainder of said zones, mixing a predetermined amount of oxidant gas with the H₂S gas and heating the admixture to an optimum pre-reaction temperature prior to its entry into each of said remaining zones so that, as the gaseous admixture comes into contact with the catalyst material therein, oxidation will take place and elemental sulphur will be liberated in vapor form, together with steam, in each of said remaining zones; periodically shifting the relative positions of the particular catalyst bed and the particular flow of fluids in each of said zones, so that each zone becomes, in succession, a reactivation zone and an oxidation zone; and continuously withdrawing the effluent gas mixture from the oxidation zone and directing it to a condensing zone and there condensing the sulphur vapor to liquid sulphur.

While the method of the present invention may be carried out with any suitable apparatus, for the purpose of illustration, the method will be described as employing apparatus generally similar to that shown in the copending application, Ser. No. 315,309, filed October 17, 1952, for Fluid Treating Apparatus, by Dan Ringo and Ernest B. Miller.

Figure 19:
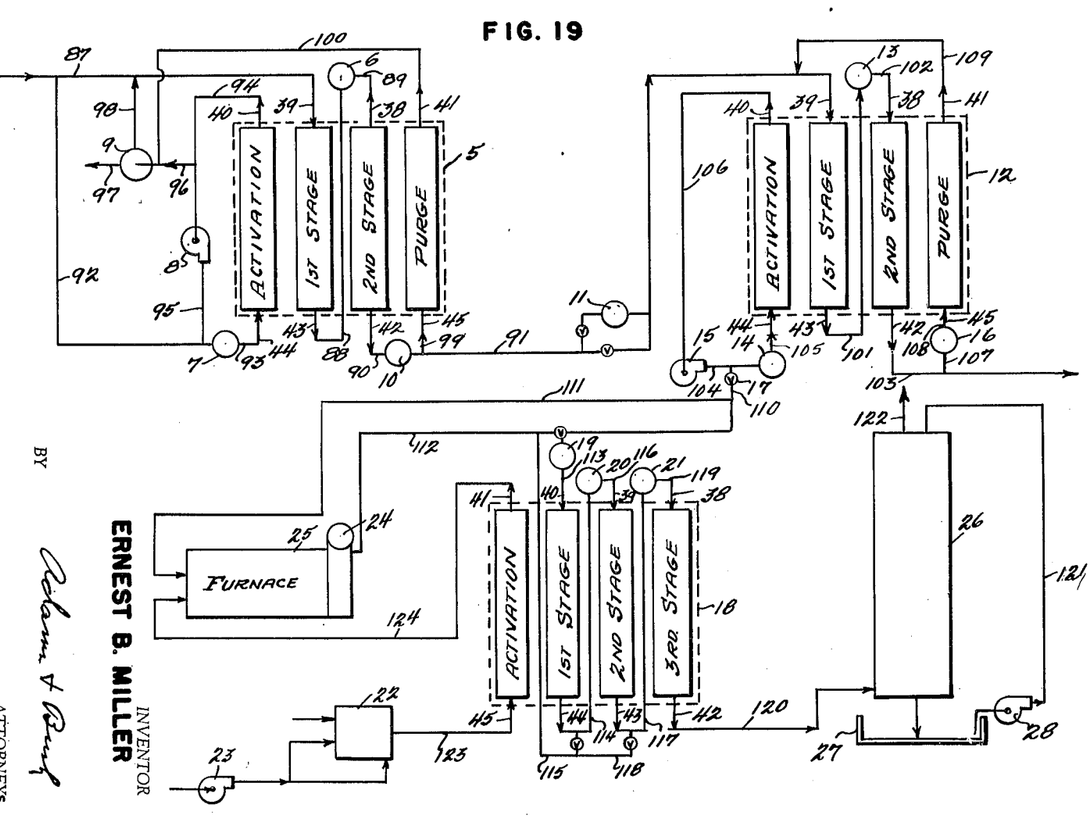
Fig. 19 is a schematic view showing the flows of the various fluids through the dehydrator, the adsorber, the converter, and the auxiliary apparatus employed therewith.

Referring now to the drawings, there is shown schematically, in Fig. 19, one embodiment of the apparatus and the arrangement thereof for carrying out the method of this invention. The apparatus shown includes a four-zone dehydrator 5, two zones of which are used as dehydrating zones, in which the wet sour gas is brought into intimate contact with the adsorbent material, one zone of which is used as an activation zone in which the adsorbent material is reactivated and stripped of its adsorbed products, the other zone of which is used as a purging zone in which the adsorbent material is purged of any of the activating gas or remaining adsorbed products; an intercooler 6 for cooling the sour gas between the first and second dehydration zones; a heater 7 employed to heat the gas used in the reactivation zone of the dehydrator; a fan 8 for recirculating the activation gas; a condenser separator 9 employed to condense the moisture and natural gasoline from the heated activation gas after it has passed through the reactivation zone of the dehydrator; an after cooler 10 employed to cool the effluent gas from the 2nd dehydration zone, a compressor 11 to be used when and if the pressure of the dry gas supplied to the adsorber falls too low; a four zone adsorber 12, two zones of which are used as adsorbing zones, in which the dry sour gas is brought into intimate contact with the adsorbing material and H₂S is adsorbed therefrom, one zone of which is used as an activation zone in which the adsorbent material is reactivated and stripped of its adsorbed H₂S, the other zone of which is used as a purging zone in which the adsorbent material is purged of any of the activating gas or remaining adsorbed products; an intercooler 13 for cooling the sour gas between the first and second adsorption zones; a heater 14 employed to heat the reactivating gas used in the reactivation zone of the adsorber; a fan or blower 15 for recirculating the reactivation gas through the activation zone of the adsorber; a cooler 16 for cooling the purging gas; a pressure reducing valve 17 mounted in the pipe line supplying H₂S gas to the converter; a four zone converter 18, three zones of which are used as reaction zones in which the H₂S is brought into intimate contact with the catalyst, and the other zone is used as an activation zone in which the catalyst is regenerated; a heater 19 for heating the admixture of H₂S and SO₂ prior to its entry into the first reaction zone; a heat exchanger 20 for heating or cooling the H₂S between the first and second reaction zones of the converter; a second heat exchanger 21 for heating or cooling the H₂S gas between the 2nd and 3d reaction zone; a heater 22 for heating the air employed as a regenerating medium for the catalyst; a fan or blower 23 for forcing the hot air through the reactivation zone of the converter; a waste heat boiler 24 in the furnace 25 in which are burned H₂S and air to supply SO₂ to be mixed with the H₂S prior to its entry into the reaction zones of the converter; a scrubbing tower 26; a pit 27 for receiving the liquid sulphur from the scrubbing tower; and a pump 28 for pumping liquid sulphur from the pit to the top of the scrubbing tower.

The dehydrator, the adsorber, and the converter are identical in construction and, as shown in Figs. 1 to 5, inclusive, each comprises an upright cylindrical pressure vessel 29; an upper cylindrical distribution chamber 30 secured to the top of the vessel 29; a lower cylindrical distribution chamber 31 secured to the bottom end of the vessel 29; suitable framework, indicated generally at 32, for supporting the vessel 29 and the distribution chambers in a raised position, a rotatable upright shaft 33 extending through the lower distribution chamber 31 and the vessel 29, with its upper end journaled in a radial bearing mounted in the top wall of the upper distribution chamber 30 and with its lower end coupled to a vertical shaft 34 connected to suitable differential gearing, indicated at 35, driven by a motor 36; a double-faced rotatable disc valve 37 mounted within each of the distribution chambers 30, 31 and fixedly secured on the shaft 33 for rotation therewith; a plurality of fluid inlet conduits, four being shown, 28, 39, 40 and 41, connected to the top of the upper distribution chamber 30 for admitting fluids thereto; a plurality of fluid outlet conduits, four being shown, 42, 43, 44 and 45 connected to the bottom of the lower distribution chamber 31 for exhausting fluids therefrom; and a plurality of fluid treating cylindrical pressure vessels 46 supported in a raised upright position encircling the vessel 29, by a suitable framework, indicated generally at 47, with each of the vessels having an inlet pipe 48 connecting its upper end portion to the bottom of the upper distribution chamber 30 and an outlet pipe 49 connecting its lower end portion to the top of the lower distribution chamber 31.

Figure 4:
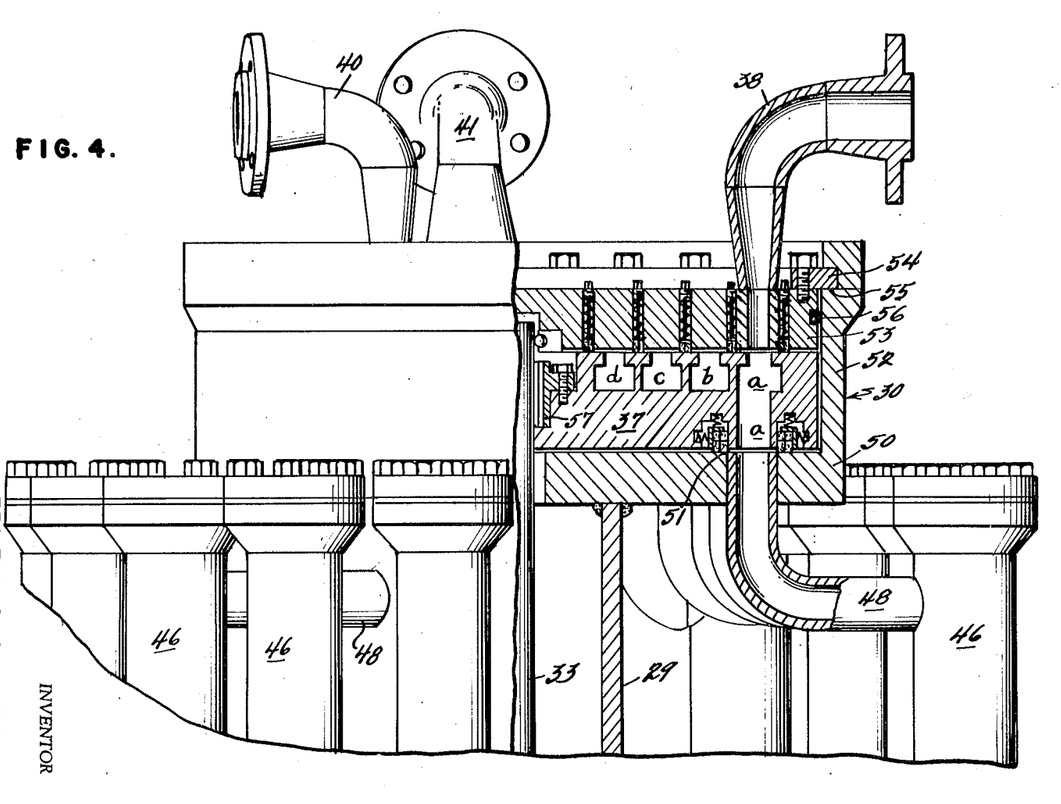
Fig. 4 is a fragmentary elevational view, partly in vertical cross section and with parts broken away, showing the upper end of the apparatus shown in Fig. 1.
Figure 5:
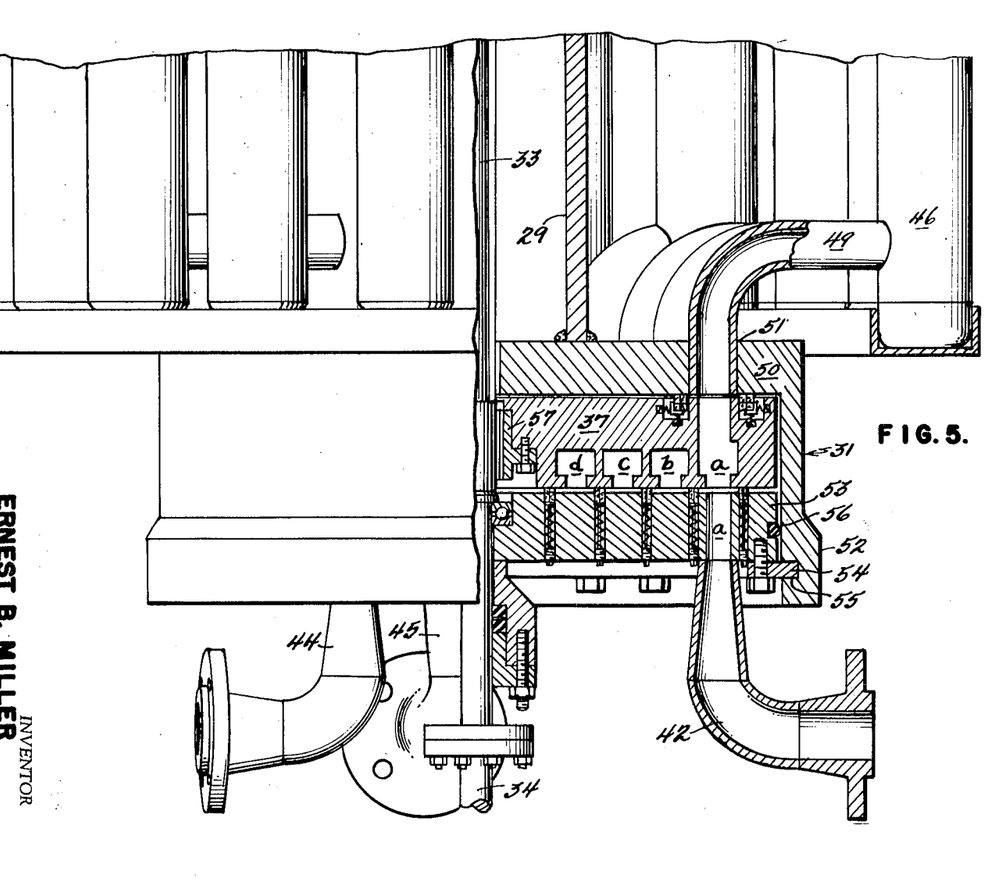
Fig. 5 is a view similar to that shown in Fig. 4, but showing the bottom end of the apparatus shown in Fig. 1.

The upper and lower distribution chambers are identical in construction and, as shown in Figs. 4 and 5, each comprises an inner tube sheet disc 50 secured to an end of the cylindrical vessel 29, as by welding, and having a plurality of circular openings 51 extending therethrough, the openings being spaced from each other and formed in a circular row spaced inwardly from the periphery of the disc; a cylindrical collar 52 which forms the side wall of the chamber and which may be formed integral with the disc 50, as shown, or welded thereto; a closure disc 53 provided with four circumferentially and radially spaced inlet openings, which, for the purpose of clarity of description are designated "a," "b," "c" and "d," respectively, secured in the outer end of the chamber, as by means of a split shear ring 54 bolted thereto and fitted into a circumferential recess 55 formed in the inner surface of the collar; and an O-ring packing 56 mounted between the closure disc 53 and the collar 52 to insure the gas-tightness of the chamber.

The four inlet conduits 38, 39, 40 and 41 are secured to the closure disc 53 of the upper distribution chamber 30, as by welding, for communication with the interior of the chamber through openings "a," "b," "c" and "d," respectively. The four outlet conduits 42, 43, 44 and 45 are secured to the closure disc 53 of the lower distribution chamber 31, as by welding, for communication with the interior of the chamber through openings "a," "b," "c" and "d," respectively. The upper ends of the inlet pipes 48 which connect the pressure vessels 46 to the upper distribution chamber 30, are fitted into the openings 51 formed in the tube sheet disc 50 of the upper distribution chamber. The lower ends of the outlet pipes 49 which connect the pressure vessels 46 to the lower distribution chamber 31, are fitted into the openings 51 formed in the tube sheet disc 50 of the lower distribution chamber.

The double-faced disc valves 37 are identical in construction and each is mounted within its respective distribution chamber between the tube sheet disc 50 and and the closure disc 53 and is fixedly connected to the shaft 33 for rotation therewith, as by means of a splined collar 57 mounted on the shaft and bolted to the disc valve.

The details of construction of the double-faced disc valve 37 are best shown in Figs. 6 to 11, inclusive. As there shown, the upper face of the disc valve has a plurality of radially spaced concentric channels formed therein, four such channels being shown, and, for the purposes of clarity of description, designated fluid annulus "a," "b," "c" and "d," respectively, (see Figs. 6 and 8). The bottom face of the disc valve 37 has a plurality of circumferentially sapced arc-shaped channels formed therein, four such channels being shown and, for the purpose of clarity, designated manifolds "a," "b," "c" and "d," respectively (see Figs. 7 and 8). The manifolds "a," "b," "c" and "d" are of the same length and have equal radii.

A plurality of generally trapezoidal-shaped circumferentially spaced passageways are formed in the disc valve, four such passageways being shown and, for the purpose of clarity of description, designated ports "a," "b," "c" and "d," respectively. The port "a" provides communication between a portion of the bottom of the annulus "a" formed in the upper face of the valve disc and the manifold "a" formed in the bottom face of the valve disc (see Fig. 8); the port "b" provides communication between a portion of the bottom of the annulus "b" and the manifold "b" (see Figs. 9 and 12); the port "c" provides communication between a portion of the bottom of the annulus "c" and the manifold "c" (see Fig. 10); and the port "d" provides communication between the annulus "d" and the manifold "d" (see Fig. 11).

The disc valves 37 are mounted within their respective distribution chambers with their surfaces containing the manifolds "a," "b," "c" and "d" slightly spaced from the tube sheet discs 50 and with each of the manifolds in vertical alignment with a group of the circular openings 51 in the tube sheet discs and with their surfaces containing the annular channels "a," "b," "c" and "d" slightly spaced from the closure disc 53 and with the annular channels in vertical alignment with the inlet openings "a," "b," "c" and "d," respectively formed in the closure disc 53.

The manner in which the anular channels "a," "b," "c" and "d" and the manifolds "a," "b," "c" and "d" are sealed off from the space within the distribution chambers is best shown in Figs. 4, 5, 13, 14 and 15. As there shown, the open tops of the annular channels "a," "b," "c" and "d" in the disc valve 37 are sealed off from the space between the closure disc 53 and the surface of the valve disc by means of annular seals 58, each seated in an annular recess formed in the inner surface of the closure disc with their lower ends pressed into engagement with the surface of the valve disc by means of split, flat, annular metal strips 59 resting on the upper ends of the seals and pressed downwardly thereon, as by means of a plurality of coiled springs 60 mounted in circumferentially spaced vertical openings extending through the closure disc with an adjusting nut 61 threaded in each opening for adjusting the pressure of the spring. Each of the adjusting nuts may be provided with a depending stem 62 extending downwardly through the spring to hold it in upright position. Each of the seals 58, preferably and as shown, comprises a plurality of annular strips of packing generally rectangular in cross section and made of any suitable material, such as "teflon" or silica impregnated asbestos.

The open bottoms of the four manifolds "a," "b," "c" and "d" formed in the disc valve 37 are sealed off from the space between the inner surface of the disc 50 and the disc valve by means of annular seals 63, each seated in an annular recess formed in the inner surface of the disc valve with their lower ends pressed into seating engagement with the surface of the disc 50

Figure 13:
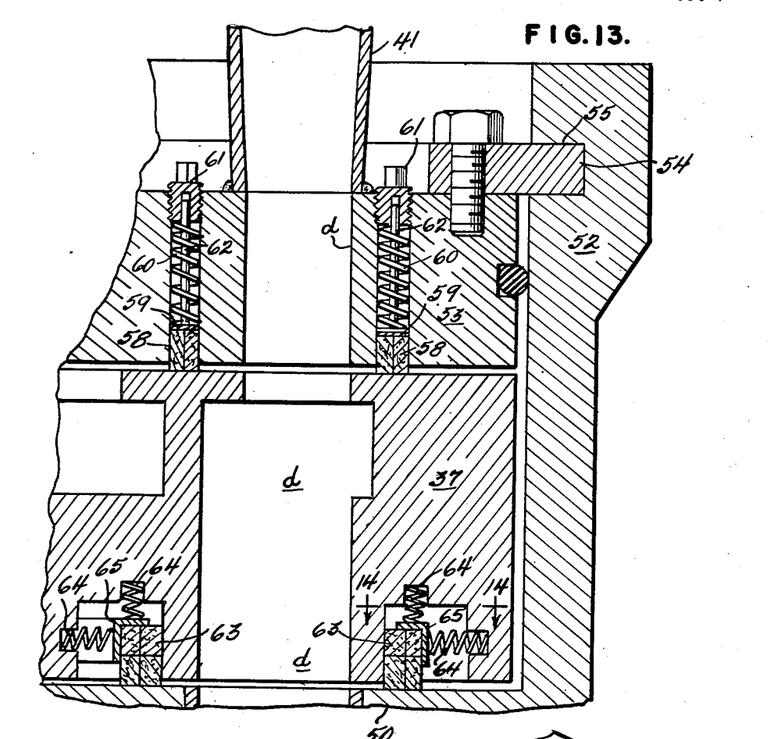
Fig. 13 is a fragmentary detailed view showing the manner in which the packing rings between the rotatable disc valve and the stationary end wall members of the distribution chambers are mounted.
Figure 14:
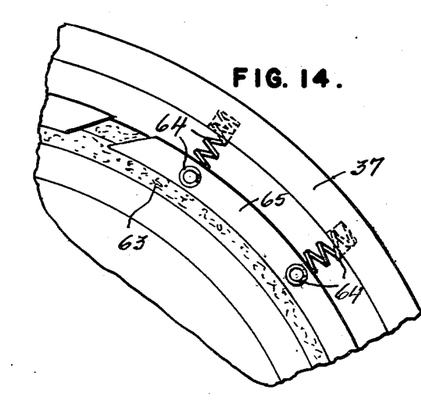
Fig. 14 is a horizontal cross sectional view, taken on the line 14—14 of Fig. 13.
Figure 15:
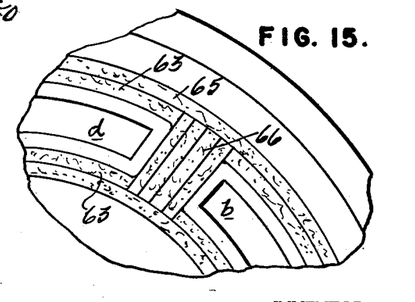
Fig. 15 is a fragmentary detailed view showing the manner in which the packing is mounted in a cross-seal.

Each of the annular seals 63 is pressed into engagement with the inner surface of the disc 50 and the side walls of the recess in which the seal is mounted, adjacent the manifold, as by means of a plurality of circumferentially spaced coiled springs 64 fitted into circular recesses formed in the top and a side wall of the recess and engaging the top and side legs of a split annular retaining ring 65, made of angle iron (see Figs. 13 and 14). Each of the seals 63, preferably, and as shown, comprises a plurality of annular strips of packing, generally rectangular in cross section and made of any suitable material such as teflon or silica impregnated asbestos.

The four manifolds "a," "b," "c" and "d" are sealed off from each other by means of cross seals 66, each seated in a radially extending recess formed in the surface of the disc valve between the adjacent end walls of the manifolds "a," "b," "c" and "d" and opening into the adjacent annular recesses in which the annular seals 63 are seated. Each cross seal is tightly wedged in its recess with its ends in sealing engagement with the adjacent side walls of the annular seals 63 and with its bottom surface pressed into tight sealing engagement with the inner surface of the disc 50 (see Fig. 15).

The widths of the manifolds "a," "b," "c" and "d" are substantially the same as the internal diameters of the circular openings 51 in the tube sheet discs 50 and each of the cross seals 66 is of a width greater than the diameters of the circular openings 51, so that each cross seal can effectively seal off one of the openings 51.

Each of the openings 51 formed in the tube sheet disc 50 of the lower distribution chamber 31 is in vertical alignment with a corresponding one of the openings 51 formed in the tube sheet disc 50 of the upper distribution chamber 30 and each of the four cross seals 66 which separate the manifolds "a," "b," "c" and "d" formed in the lower disc valve 37 is in vertical alignment with a corresponding one of the cross seals 66 which separate the manifolds "a," "b," "c" and "d" formed in the upper valve disc 37.

When the rotary valve discs 37 are stationary, the foregoing arrangement, in effect, divides the pressure vessels into four groups or stages, with one group connected to communicate with the manifolds "a," one group connected to communicate with the manifolds "b," one group connected to communicate with the manifolds "c," and one group connected to communicate with the manifolds "d," so that four separate, distinct and continuous flows of fluid may pass through the apparatus. Each flow entering the upper distribution chamber 30 by means of one of the inlet conduits 38, 39, 40, or 41, thence through one of the groups of pressure vessels 46 into the lower distribution chamber 31 and out through one of the outlet conduits 42, 43, 44 or 45. As the upper and lower disc valves rotate, each of the flows of fluid will successively pass through each of the pressure vessels 46 in each of the four groups.

Obviously, the respective pairs of manifolds "a—a," "b—b," "c—c" and "d—d" may be of different lengths so that the number of pressure vessels in communication with one pair of manifolds may be different from the number in communication with the other pairs of manifolds, if desired.

Figures 16, 17, 18:
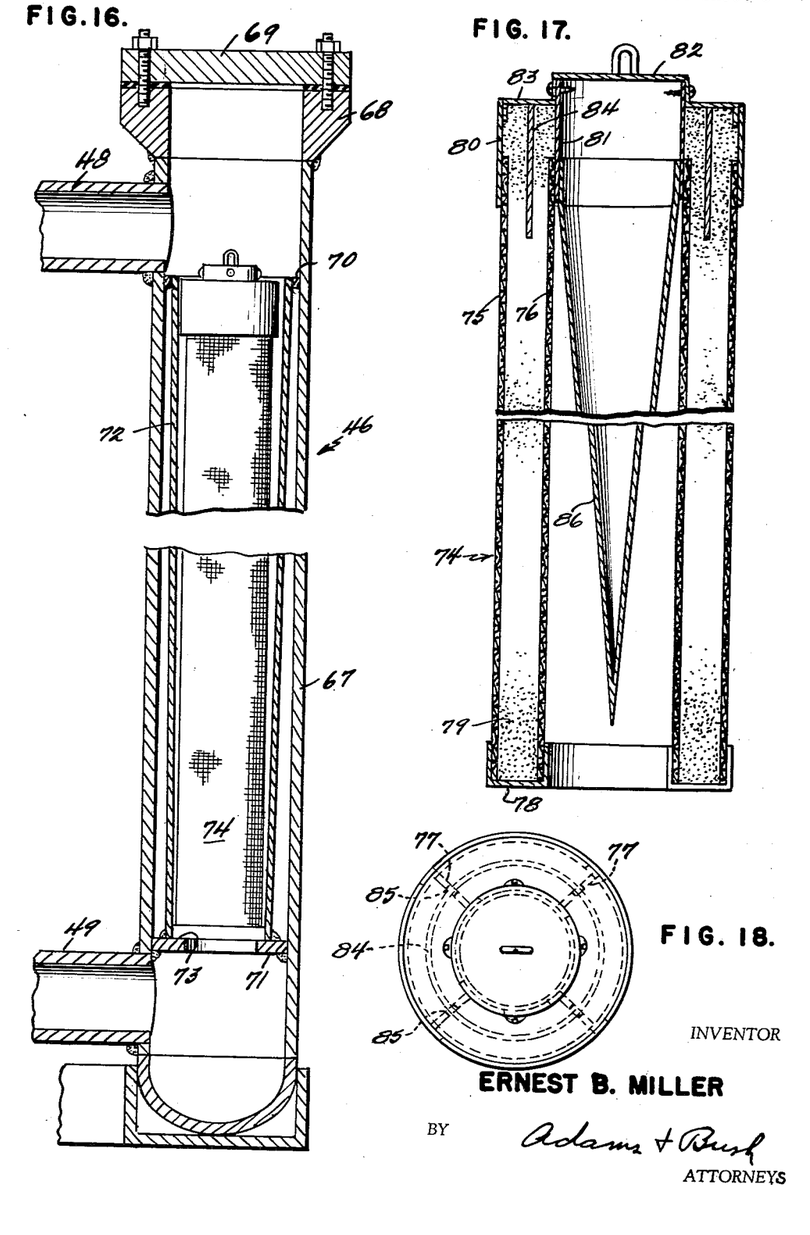
Fig. 16 is a vertical sectional view of one of the pressure vessels having a fluid treating material container mounted therein.
Fig. 17 is a vertical sectional view, with parts broken away, of the fluid treating material container shown in Fig. 16.
Fig. 18 is a plan view of the container shown in Fig. 17.

The fluid treating material containing pressure vessels 46 are identical in construction and, as shown in Fig. 16, each comprises an elongated hollow cylindrical member 67 having a closed rounded bottom end and an open upper end provided with an integral flange 68, to which is secured, as by bolting, a removable cover plate 69.

Horizontally disposed and vertically spaced annular discs 70, 71 are mounted in the upper and lower portions, respectively, of the member 67 and secured therein, as by welding, to form a gas-tight joint between the outer peripheral edges of the discs and the side walls of the member 67. The diameter of the opening in the upper disc 70 is greater than the diameter of the opening in the lower disc 71 and a generally frusto-conically shaped, hollow baffle member 72 extends between the discs 70 and 71 with its top end fitted in the opening in the upper disc 70 and its lower end secured to the disc 71, as by welding, along a circle spaced outwardly from the peripheral edge of the opening therein to leave an annular ledge 73 surrounding the opening. The annular ledge 73 forms a support for an elongated annular fluid treating material container 74. The container 74 is removably mounted within the frusto-conically shaped baffle member 72, with its bottom end resting on the ledge 73 and with its upper end extending through the opening in the upper disc 70.

The inlet pipe 48 is connected, as by welding, to the vessel 46 at a point above the upper annular disc 70 and the outlet pipe 49 is connected, as by welding, to the vessel 46 at a point below the lower annular disc 71, as shown in Fig. 16.

The containers 74 are identical in construction and, as shown in Figs. 17 and 18, each comprises two concentric tubular screens 75, 76 held in spaced-apart relation by a plurality of longitudinal radial fins 77, with the annular space between the screens closed at the bottom, as by a flanged annular plate 78. The mesh of the screens is such as to retain a granular fluid treating material 79 in the annular space between the screens. In the instant case, the fluid treating material 79 may be any adsorbent having characteristics substantially like silica gel or the gel of other activated hydrous oxides. Preferably, silica gel is used, and in the converter, the silica gel is impregnated with a metallic oxide such as oxide of iron, nickel or manganese.

Each of the containers 74 is closed at its top by means of concentric hoops or metal bands 80, 81, mounted on the concentric screens 75, 76, and a cover plate 82 detachably connected to the inner hoop or band 81, as by screws, and having a depending annular flange 83 fitting between the hoops or bands 80, 81. A depending cylindrical fin 84 is secured to the flange 83 and projects downwardly between and below the hoops or bands 80, 81, and fits in slits 85 formed in the upper ends of the radial fins 77, all as shown in Figs. 17 and 18. The construction is such that, as the silica gel settles down, leaving a space between the top portion of the wire screens devoid of silica gel, the fin 84 will prevent fluid from passing through the space.

Mounted within the inner wire screen 76 is an inverted substantially conically-shaped baffle member 86. The baffle member 86 is closed at its apex which extends downwardly to a point near the bottom of the container and has its upper peripheral edge suitably secured to the band 81, as by welding. Preferably, the baffle member 86 is made of thin sheet metal.

When the container 74 is mounted within the hollow member 72, as shown in Fig. 16, the elongated annular space between the walls of the member 72 and the inverted conical baffle member 86 forms an elongated frusto-conically shaped duct which is annular in cross section. The annular container, filled with silica gel, is positioned in the duct between the members 72 and 86 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow, thereby creating a substantially constant static head over the face of the barrier, resulting in a substantially uniform distribution of the fluid throughout the entire barrier area. Thus, it will be seen that by using the baffle members 72 and 86, the entire barrier area is made use of with resultant increase in efficiency, capacity, and economy.

The flows of the various fluids through the dehydrator, the adsorber, the converter, and the auxiliary apparatus is schematically shown in Fig. 19.

As there shown, the wet natural gas from which moisture and natural gasoline are to be removed, is supplied under high pressure, from 300 to 1000 lbs. gauge, by pipe lines 87 and enters the upper distribution chamber 30 of the dehydrator 5 through inlet conduit 39 and passes through inlet opening "b" in the closure disc 53 into the annular channel or annulus "b" formed in the upper surface of the valve disc 37. From annulus "b" the gas passes through port "b" into manifold "b" formed in the bottom surface of the valve disc 37. From manifold "b" the gas passes through openings 51 formed in the tube sheet disc 50 and inlet pipes 48 into the upper end portions of the group of pressure vessels 46 which are at that time in communication with manifold "b." The gas passes down through the vessels 46 and through the silica gel beds therein into the bottoms of the vessels. The baffle members 72 and 86 within the vessels 46 insure a substantially uniform flow and distribution of the wet gas through the silica gel beds which adsorb some of the moisture and gasoline content from the gas. From the bottoms of the vessels 46 the now partially dried gas passes through outlet pipes 49 and openings 51 in the tube sheet disc 50 in the lower distribution chamber into manifold "b" formed on the upper surface of the valve disc 37 in the lower distribution chamber. From manifold "b" the gas passes through port "b" into the channel or annulus "b" formed in the bottom surface of the valve disc 37 and thence through opening "b" in the closure disc 53 into the outlet conduit 43.

From the outlet conduit 43, the partially dried gas passes through pipe line 88 into an intercooler 6, where it is cooled. The intercooler 6 may be of the water circulating type. From the intercooler, the gas passes through pipe line 89, inlet conduit 38, and inlet opening "a" in the closure disc 53 of the upper distribution chamber 30, into the annular channel or annulus "a" in the upper valve disc 37. From the annulus "a" the gas passes through port "a" into manifold "a" in the bottom of the valve disc 37. From the manifold "a" the gas passes through openings 51 formed in the valve disc 37 and inlet pipes 48 into the upper end portions of the group of pressure vessels 46 which are at that time in communication with manifold "a." The gas passes downwardly through the pressure vessels 46 of the second group and through the silica gel beds therein into the bottoms thereof. The remainder of the moisture and gasoline content of the gas being adsorbed during its passage through the silica gel beds.

From the bottoms of the vessels 46 of the second group, the now dried gas passes through outlet pipes 49 and openings 51 in the tube sheet disc 50 in the lower distribution chamber into manifold "a" in the upper surface of the lower disc valve 37. From the manifold "a" the gas passes through port "a" into the annular channel or annulus "a" formed in the bottom surface of the valve disc 37 and thence through outlet opening "a" in the closure disc 53 into the outlet conduit 42, and through pipe line 90 to the after cooler 10, and from there through pipe lines 91 to the adsorber 12. A compressor 11 is placed in a valved bypass line connected to pipe line 91 to be used to raise the pressure of the gas, if required.

A portion of the incoming wet gas is diverted from the supply line 87, by means of a pipe line 92, through a heater 7, where its temperature is raised to from 350° F. to 450° F., depending upon its moisture content and the type of hydrocarbons to be recovered. From the heater 7, the heated gas passes through pipe line 93, inlet conduit 44, and inlet opening "c" in the closure disc 53 of the lower distribution chamber 31, into annular channel or annulus "c" in the lower disc valve 37. From the annulus "c" the heated gas passes through port "c" into manifold "c" in the top of the valve disc 37. From the manifold "c" the gas passes through openings 51 formed in the tube sheet disc 50 and inlet pipes 49 into the lower end portions of the group of pressure vessels 46 which are at that time in communication with the manifold "c." The heated gas passes upwardly through the pressure vessels of the third group and through the silica gel beds therein into the tops of the vessels. As the heated gas passes through the silica gel beds it removes the moisture and natural gasoline therefrom. From the tops of the vessels 46 of the third group, the hot, moisture and gasoline laden gas passes through outlet pipes 48 and openings 51 in the tube sheet disc 50 in the upper distribution chamber 30 into manifold "c" in the lower surface of the upper valve disc 37. From the manifold "c" the gaseous mixture passes through port "c" into the annular channel or annulus "c" formed in the top surface of the valve disc 37 and thence through outlet opening "c" in the closure disc 53 into the outlet conduit 40 and from there through pipe line 94 to the fan or blower 8 and is recirculated through pipe line 95, the heater 7, and the activation zone of the dehydrator. A portion of the hot gas and vapor stripped from the adsorbent beds in the activation zone of the dehydrator is continuously withdrawn through pipe line 96 and passes through the condenser separator 9, where the moisture and natural gasoline are condensed and removed through drain pipe 97. From the condenser separator 9, the gas passes through pipe line 98, back into the supply line 87, where it is mixed with the incoming wet gas on the way to the first dehydrating zone of the dehydrator. A portion of the dehydrated gas is diverted from the pipe line 91, after it has passed through the after cooler 10, by means of a pipe line 99, and passes through pipe line 99, inlet conduit 45, and inlet opening "d" in the closure disc 53 of the lower distribution chamber 31, into annulus "d" on the lower disc valve 37. From the annulus "d" the gas passes through port "d" into manifold "d" in the top of the disc valve 37. From the manifold "d" the gas passes through openings 51 formed in the tube sheet disc 50 and inlet pipes 49 into the lower end portions of the group of pressure vessels 46 which are at that time in communication with the manifold "d." The gas passes upwardly through the pressure vessels of the fourth group and through the silica gel beds therein into the tops of the vessels. As the gas passes through the silica gel beds it removes all remaining activation gas and any remaining moisture and natural gasoline deposited on the beds, thereby purging them. From the tops of the vessels 46 of the fourth group, the purging gas passes through outlet pipes 48 and openings 51 in the tube sheet disc 50 in the upper distribution chamber 30 into manifold "d" in the lower surface of the upper disc valve 37. From the manifold "d" the gas passes through port "d" into the annulus "d" formed in the top surface of the valve disc, and thence through outlet opening "d" in the closure disc 53 into the outlet conduit 41 and from there through pipe line 100 back to pipe line 96 and to the condenser 9.

The gas being dehydrated makes two passages through groups of the silica gel containing pressure vessels, while the heated gas or reactivation medium and the purging gas both make a single passage through a group of the silica gel containing pressure vessels. For convenience in description, the pressure vessels which form the group through which the first dehydration passage is made is called the first dehydration stage, the group through which the second dehydrating passage is made is called the second dehydration stage, the group through which the hot gas used for reactivation passes is called the reactivation stage, and the group through which the purging gas passes is called the purging stage. Also, the pressure vessels are called zones in which either dehydration, reactivation or purging takes place, depending upon the particular fluid flowing therethrough at a given time. As the disc valves 37 are rotated, the flows of the natural gas, the flow of the heated gas, and the flow of the purging gas through the respective groups of pressure vessels or zones communicating with the manifolds "a," "b," "c" and "d" in the upper and lower distribution chambers, respectively, are shifted by a simultaneous rotary movement so that the trailing pressure vessel or zone, in the direction of rotation, in each group will be transferred to the adjacent following group, whereby each pressure vessel or zone will become, in succession, a dehydration zone, a reactivation zone and a purging zone.

Figure 1:
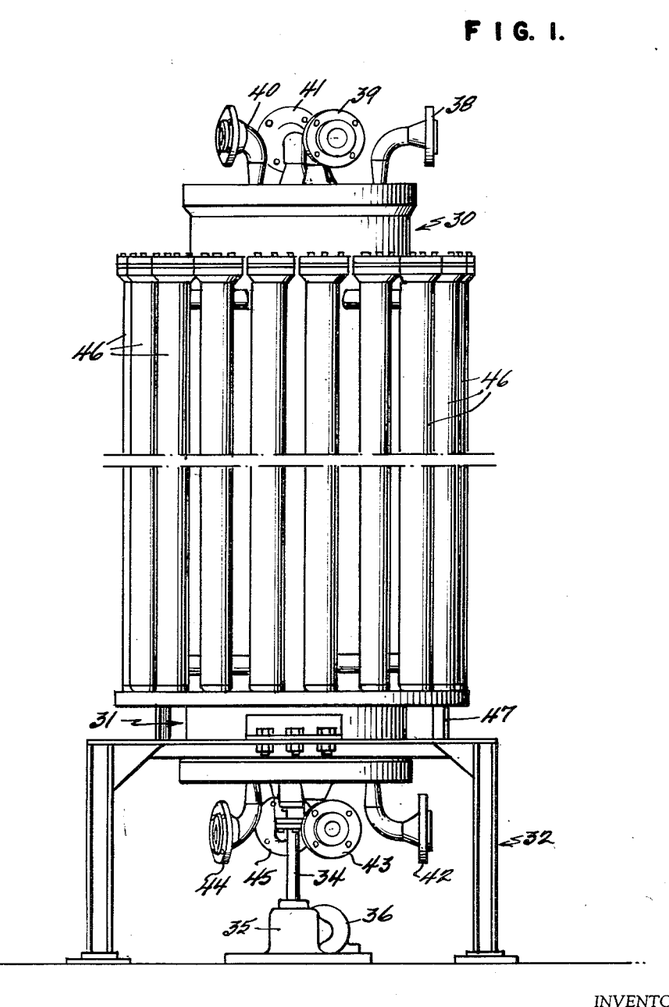
Fig. 1 is a side elevational view of a preferred form of fluid treating apparatus employed to carry out the method of the present invention.
Figure 2:
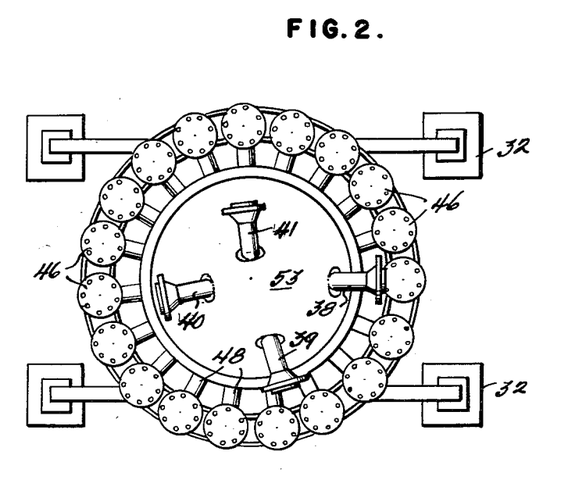
Fig. 2 is a plan view of the apparatus shown in Fig. 1.
Figure 3:
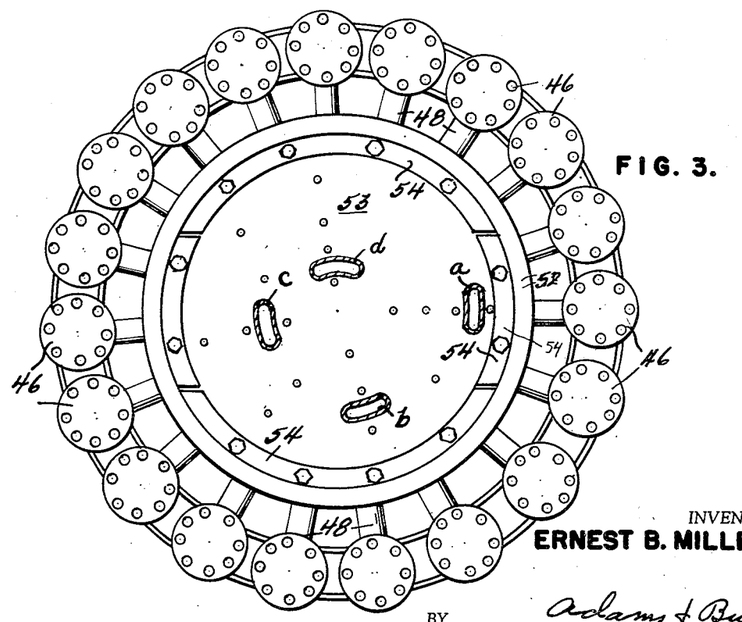
Fig. 3 is a plan view, on a larger scale, of the apparatus shown in Fig. 1, with the inlet conduits broken away.
Figure 6:
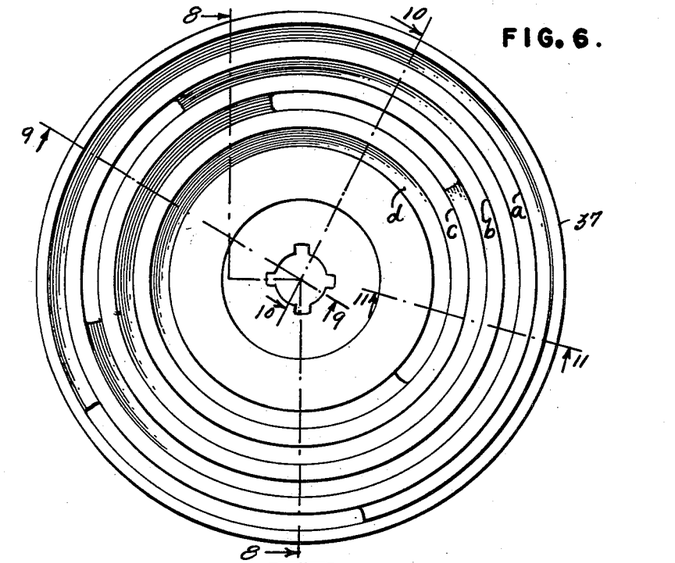
Fig. 6 is a plan view of one surface of a rotatable disc valve, with packing rings omitted.
Figure 7:
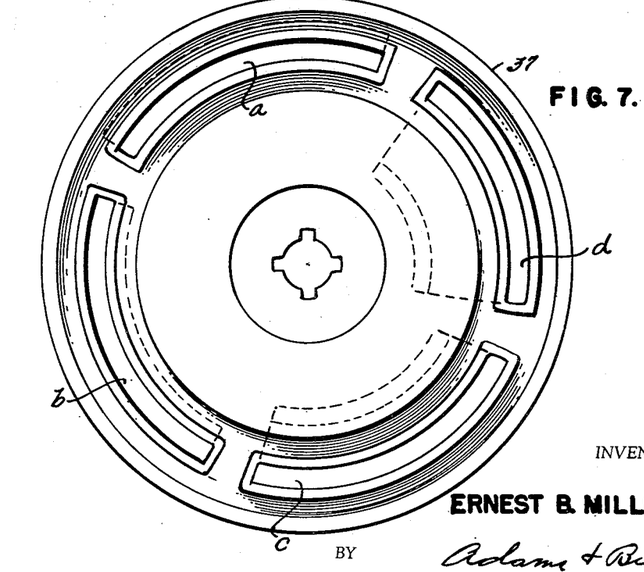
Fig. 7 is a plan view of the other surface of the rotatable disc valve shown in Fig. 6, with the packing rings and seal packing omitted.
Figure 8:
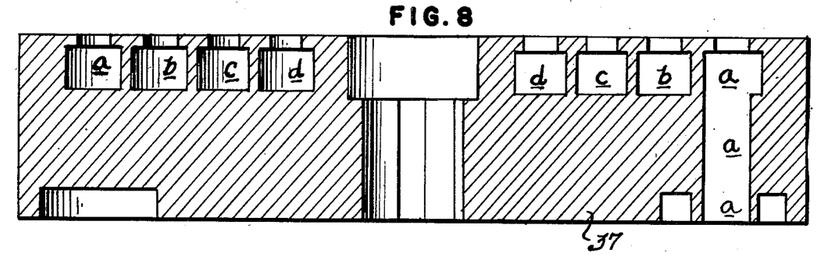
Fig. 8 is a vertical cross sectional view, taken on the line 8—8 of Fig. 6.
Figure 9:
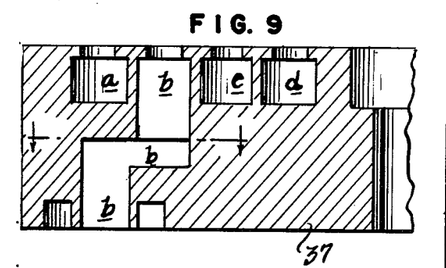
Fig. 9 is a vertical cross sectional view, taken on the line 9—9 of Fig. 6.
Figure 10:
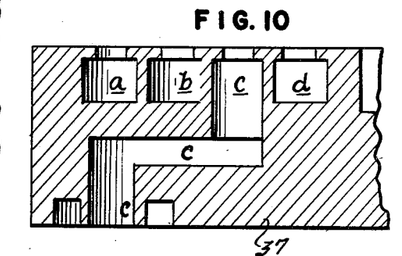
Fig. 10 is a vertical cross sectional view, taken on the line 10—10 of Fig. 6.
Figures 11, 12:
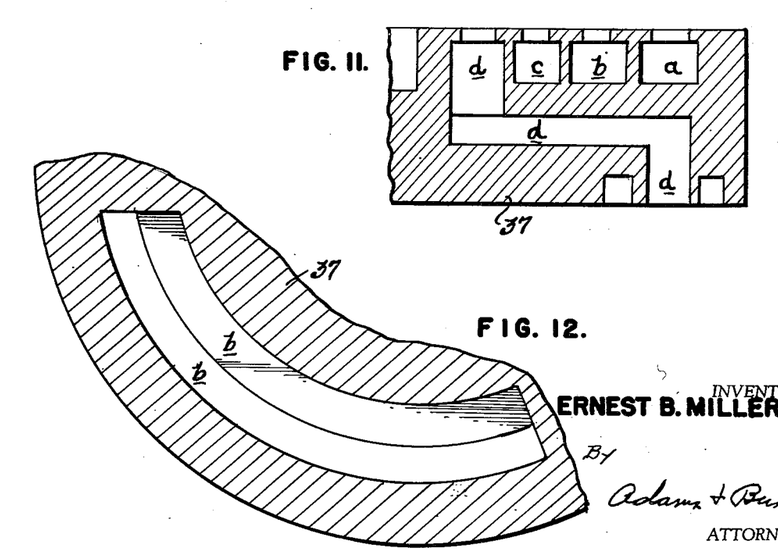
Fig. 11 is a vertical cross sectional view, taken on the line 11—11 of Fig. 6.
Fig. 12 is a horizontal cross sectional view, taken on the line 12—12 of Fig. 9.

In the particular embodiment of the invention illustrated, the valve discs 37 of the dehydrator are rotated counterclockwise, as viewed in Figs. 2 and 6, and at a rate of 1 revolution every 10 minutes; thus, it will be seen that as the valve discs 37 rotate, each of the pressure vessels 46 will be successively brought into communication with the manifolds "a," "b," "c" and "d" in the upper and lower distribution chambers, so that each pressure vessel will, in turn, become a reactivation zone, a purging zone, a second dehydration zone, and a first dehydration zone.

The dehydrated natural gas passes from the dehydrator 5 under high pressure (300–1000 lbs. p. s. i.) through pipe line 91 and enters the upper distribution chamber of the adsorber 12 through inlet pipe 39, and passes through the annuluses "b," ports "b" and manifolds "b" in the upper and lower distribution chambers and the group of pressure vessels 46 which are at that time in communication with the manifolds "b." As the gas passes through the silica gel beds in the pressure vessels, part of the contained $H_2S$ is adsorbed therefrom. After its first passage through the adsorber, the gas passes from the lower distribution chamber through outlet pipe 43 and pipe line 101 to the intercooler 13. From the intercooler 13 the gas passes through pipe line 102 and inlet pipe 38 into the upper distribution chamber of the adsorber and passes through the annuluses "a," ports "a" and manifolds "a" in the upper and lower distribution chambers and the group of pressure vessels 46 which are at that time in communication with the manifolds "a." As the gas passes through the silica gel beds the remainder of the contained H₂S is adsorbed therefrom. After its second passage through the adsorber, the gas, now free of H₂S, passes from the lower distribution chamber of the adsorber through outlet pipe 42 and through pipe line 103 to its various points of use.

The regenerating medium employed is H₂S and it is continuously heated and recirculated through the activation zone of the adsorber by a fan or blower 15. From the blower, the H₂S passes through pipe line 104 to the heater 14, where its temperature is raised to from 250° F. to 400° F. From the heater 14, the heated H₂S gas passes through pipe line 105 and inlet pipe 44 into the lower distribution chamber of the adsorber and passes upwardly through the annuluses "c," ports "c" and manifolds "c" in the lower and upper distribution chambers and the group of pressure vessels 46 which are at that time in communication with the manifolds "c." As the heated H₂S passes through the silica gel beds, the adsorbed H₂S contained therein will be removed and pass, with the heated H₂S, out of the adsorber and the silica gel beds will be reactivated for further use. After its passage through the activation zone of the adsorber, the heated H₂S, together with the H₂S removed from the silica gel beds, passes from the upper distribution chamber of the adsorber through outlet pipe 40 and pipe line 106 back to the fan 15 for recirculation through the adsorber. A portion of the effluent gas from the last adsorbing zone of the adsorber, now free from H₂S, is diverted from pipe line 103, by means of pipe line 107, through the cooler 16. From the cooler 16, the gas passes through pipe line 108, and inlet pipe 45 into the lower distribution chamber of the adsorber and passes upwardly through the annuluses "d," ports "d" and manifolds "d" in the lower and upper distribution chambers and the group of pressure vessels 46 which are at that time in communication with the manifolds "d." As the gas passes through the silica gel beds, any remaining H₂S contained therein will be removed and passed, with the gas, out of the adsorber and the silica gel beds will be purged. After its passage through the purging zone of the adsorber, the purging gas passes from the upper distribution chamber of the adsorber through outlet pipe 41 and pipe line 109, back to pipe line 91, where it is mixed with the dry gas on the way to the first adsorbing zone of the adsorber.

The gas from which the H₂S is to be adsorbed makes two passages through groups of the silica gel containing pressure vessels, while the heated gas or reactivating medium and the purging gas both make a single passage through a group of the silica gel containing pressure vessels. For convenience in description, the pressure vessels which form the group through which the first adsorbing passage is made is called the first adsorption stage, the group through which the second adsorbing passage is made is called the second adsorption stage, the group through which the hot gas used for reactivation passes is called the reactivation stage, and the group through which the purging gas passes is called the purging stage. Also, the pressure vessels are called zones in which either adsorption, reaction or purging takes place, depending upon the particular fluid flowing therethrough at a given time.

As the disc valves 37 are rotated, the flows of the dry natural gas, the flow of the H₂S gas, and the flow of the purging gas, through the respective groups of pressure vessels or zones communicating with the manifolds "a," "b," "c" and "d" in the upper and lower distribution chambers, respectively, are shifted by a simultaneous rotary movement so that the trailing pressure vessel or zone in the direction of rotation, in each group will be transferred to the adjacent following group, whereby each pressure vessel or zone will become, in succession, an activation zone, a purging zone, a second adsorption zone, and a first adsorption zone.

In the particular embodiment of the invention illustrated, the valve discs 37 of the adsorber are rotated counterclockwise, as viewed in Fig. 2, and at a rate of 1 revolution every 10 minutes; thus, it will be seen that, as the valve discs 37 rotate, each of the pressure vessels 46 will be successively brought in communication with the manifolds "a," "b," "c" and "d" in the upper and lower distribution chambers, so that each pressure vessel will, in turn, become an activation zone, a purging zone, a second adsorption, and a first adsorption zone.

A portion of the H₂S gas is continuously withdrawn from its closed recirculating path by means of pipe line 110 and passes into heater 19. A pressure reducing valve 17 is placed in the pipe line 110 to reduce the pressure of the H₂S before it is sent to the converter at about 5 lbs. p.s.i. A controlled portion of the H₂S from pipe line 110 passes through pipe line 111 to the furnace 25 of the waste heat boiler 24, where it is mixed with air and burned to supply SO₂ for use as the oxidant in the reaction zones of the converter. From the furnace 25, SO₂ passes through pipe line 112 to pipe line 110, where it is mixed with the H₂S in controlled proportions and the mixed gas passes into the heater 19, where its temperature is raised to an optimum pre-reaction temperature of from 250° F. to 350° F. From the heater 19, the mixture of H₂S and SO₂ gases passes through pipe line 113 and enters the upper distribution chamber of the converter 18 through inlet pipe 40 and passes through the annuluses "c," ports "c" and manifolds "c" in the upper and lower distribution chambers and the group of pressure vessels 46 which are at that time in communication with the manifolds "c." As the gaseous admixture passes through the catalyst containing silica gel beds in the pressure vessels 46, an exothermic reaction takes place in which elemental sulphur is liberated in vapor form, together with steam, in accordance with the following equation:

$$2H_2S + SO_2 = 2H_2O + 3S$$

After its first passage through the converter, the gaseous admixture passes from the lower distribution chamber through outlet pipe 44 and pipe line 114 to the heat exchanger 20. Additional SO₂, in controlled amount, may be admitted to the effluent gaseous mixture from the first reaction zone, prior to its entry into the heat exchanger 20, if desired, by means of pipe line 115, which connects with SO₂ supply line 112. The temperature of the gaseous mixture is adjusted in the heat exchanger 20 to an optimum pre-reaction temperature. From the heat exchanger 20 the gaseous mixture passes through pipe line 116 and enters the upper distribution chamber of the converter through inlet pipe 39 and passes through the annuluses "b," ports "b" and manifolds "b" in the upper and lower distribution chambers and the group of pressure vessels which are at that time in communication with the manifolds "b." As the gaseous mixture passes through the catalyst containing silica gel beds in the pressure vessels 46, further reaction takes place, liberating more sulphur vapor and steam. After its second passage through the converter, the gaseous mixture passes from the lower distribution chamber through outlet pipe 43 and pipe line 117 to the heat exchanger 21. Additional SO₂, in controlled amount, may be admitted to the effluent gaseous admixture from the second reaction zone of the converter, prior to its entry into the heat exchanger 21, if desired, by means of branch pipe line 118 which connects with pipe line 115. The temperature of the gaseous admixture is adjusted in the heat exchanger 21 to an optimum pre-reaction temperature. From the heat exchanger 21, the gaseous admixture passes through pipe line 119 and enters the upper distribution chamber of the converter through inlet pipe 38 and passes through the annuluses "a," ports "a" and manifolds "a" in the upper and lower distribution chambers and the group of pressure vessels 46 which are at that time in communication with the manifolds "a." As the gaseous admixture passes through the catalyst containing silica gel beds in the pressure vessels 46, further and complete reaction takes place, liberating the remaining sulphur in the form of sulphur vapor, together with steam.

After its third passage through the converter, the gaseous admixture, which now consists almost solely of sulphur vapor and steam, passes from the lower distribution chamber through outlet pipe 42 and passes through pipe line 120 into the bottom of the scrubbing tower or zone 26. The gaseous admixture comprising sulphur vapor and steam rises in the scrubbing tower against a downward flow of molten sulphur, which condenses the sulphur vapor into liquid sulphur, which collects in the bottom of the tower and from thence flows into pit 27. Molten sulphur is pumped from the pit 27 by pump 28 and passes to the top of the scrubbing tower 25, as by means of pipe line 121. Any effluent gases from the scrubbing tower pass therefrom through exhaust pipe line 122.

A mixture of sweet gas and air is burned in heater 22, and a fan or blower 23 supplies air to the heater, where it mixes with the products of combustion and the gaseous admixture is heated to about from 900° F. to 1000° F. From the heater, the heated gaseous mixture passes through pipe line 123 and inlet pipe 45 into the lower distribution chamber of the converter and passes upwardly through the annuluses "d," ports "d" and manifolds "d" in the lower and upper distribution chambers and the group of pressure vessels 46 which are at that time in communication with the manifolds "d". As the heated gaseous mixture passes through the silica gel beds, all traces of sulphur adsorbed therein are removed and pass, with the gaseous mixture, out of the converter and the catalyst therein is reactivated. After its passage through the reactivation zone of the converter, the heated gases of regeneration pass from the upper distribution chamber of the converter through outlet pipe 41 and then through pipe line 124 to the furnace 25 of the waste heat boiler 24, where they are mixed with the $H_2S$ supplied by pipe line 111 and burned to supply $SO_2$.

The $H_2S$ makes three passages through groups of the silica gel containing pressure vessels, while the reactivating medium makes a single passage through a group of the silica gel containing pressure vessels. For convenience in description, the pressure vessels which form the group through which the first reacting or oxidizing passage is made is called the first reaction stage, the group through which the second reacting passage is made is called the second reaction stage, the group through which the third reacting passage is made is called the third reaction stage, and the group through which the heated regenerating gases pass is called the reactivation stage. Also, the pressure vessels are called zones in which either reaction or reactivation takes place, depending upon the particular fluid flowing therethrough at a given time.

As the disc valves 37 are rotated, the flows of the $H_2S$ gas and the flow of the reactivating medium through the respective groups of pressure vessels or zones communicating with the manifolds "a," "b," "c" and "d" in the upper and lower distribution chambers, are shifted by a simultaneous rotary movement so that the trailing pressure vessel or zone, in the direction of rotation, in each group will be transferred to the adjacent following group, whereby each pressure vessel or zone will become, in succession, an activation zone, a third reaction zone, a second reaction zone and a first reaction zone.

In the particular embodiment of the invention illustrated, the valve discs 37 of the converter are rotated counterclockwise, as viewed in Fig. 2, and at a rate of 1 revolution every 10 minutes; thus, it will be seen that as the valve discs 37 rotate, each of the pressure vessels 46 will be successively brought in communication with the manifolds "a," "b," "c" and "d" in the upper and lower distribution chambers, so that each pressure vessel will, in turn, become an activation zone, a third reaction zone, a second reaction zone, and a first reaction zone.

It is contemplated that the method of the present invention be carried out as a continuous process, treating gas direct from the wells and at well pressure, which may be as high as 1000 lbs. p. s. i. or more. The particular number of dehydration stages employed in the dehydrator will depend upon the moisture and natural gasoline content of the gas being treated. Likewise, the particular number of adsorption stages employed in the adsorber would depend upon the $H_2S$ content of the gas being treated. Also, the particular number of reaction stages employed in the converter would depend upon the volume flow of the gaseous mixture admitted to the converter and the ratio of $H_2S$ to the oxidant in each reaction zone.

Obviously, the invention is not restricted to the particular embodiment thereof herein shown and described. Moreover, it is not indispensable that all of the features of the invention be used conjointly, since they may be employed advantageously in various combinations and sub-combinations.

What is claimed is:

1. In the removal and recovery of $H_2S$ from natural gas containing $H_2S$ involving the contact of adsorbent material with the natural gas from which water vapor and condensable hydrocarbons have previously been removed therefrom with resultant adsorption of the $H_2S$ by the adsorbent material and the subsequent treatment of the adsorbent material with a heated medium to vaporize and remove the $H_2S$ and thereby reactivate the adsorbent material for further contact with the natural gas, the improvement which comprises providing at least one bed of adsorbent material in each of a plurality of zones; continuously heating and recycling a flow of a gas consisting substantially of $H_2S$ under high pressure through at least one of said zones to remove the $H_2S$ contained in the adsorbent material therein and reactivate the adsorbent material; directing a continuous flow of the natural gas under high pressure through the remainder of said zones so that the $H_2S$ content of the gas will be adsorbed by the adsorbent material therein; periodically shifting the relative position of the particular adsorbent material and the particular flow of fluid in each of said zones so that each zone becomes, in succession, a reactivation zone and an adsorption zone; and continuously withdrawing a portion of the hot $H_2S$ gas from the recycling path.

2. In the removal and recovery of $H_2S$ from natural gas containing $H_2S$ involving the contact of adsorbent material with the natural gas from which water vapor and condensable hydrocarbons have previously been removed therefrom with resultant adsorption of the $H_2S$ by the adsorbent material and the subsequent treatment of the adsorbent material with a heated medium to vaporize and remove the $H_2S$ and thereby reactivate the adsorbent material for further contact with the natural gas, the improvement which comprises providing at least one bed of adsorbent material in each of a plurality of zones; continuously heating and recycling a flow of a gas consisting substantially of $H_2S$ under high pressure through at least one of said zones to remove the $H_2S$ contained in the adsorbent material therein and reactivate the adsorbent material, directing a continuous flow of natural gas under high pressure so that it will make a first passage through at least an additional one of said zones and a second passage through the remainder of said zones so that the $H_2S$ content of the gas will be adsorbed by the adsorbent material therein; periodically shifting the flows of the natural gas and the $H_2S$ activating gas successively through the several zones so that each zone, in succession, becomes a reactivation zone, and in reverse order to the flow of natural gas being treated therethrough, each a successive adsorption zone; whereby the natural gas will make its last passage through freshly activated adsorbent material; and continuously withdrawing a portion of the hot H₂S from its recycling path.

3. In the removal and recovery of H₂S from natural gas containing H₂S involving the contact of adsorbent material with the natural gas from which water vapor and condensable hydrocarbons have previously been removed therefrom with resultant adsorption of the H₂S by the adsorbent material and the subsequent treatment of the adsorbent material with a heated medium to vaporize and remove the H₂S and thereby reactivate the adsorbent material for further contact with the natural gas, the improvement which comprises providing at least one bed of adsorbent material in each of a plurality of zones; continuously heating and recycling a flow of a gas consisting substantially of H₂S under high pressure through at least one of said zones to remove the H₂S contained in the adsorbent material therein and reactivate the adsorbent material, continuously directing the flow of a purging medium under high pressure through at least another one of said zones to purge the adsorbent material therein by removing all of the H₂S gas therefrom; directing a continuous flow of the natural gas under high pressure through the remainder of said zones so that the H₂S content of the gas will be adsorbed by the adsorbent material therein; periodically shifting the relative position of the particular adsorbent material and the particular flow of fluid in each of said zones so that each zone becomes, in succession, a reactivation zone, a purging zone, and an adsorption zone; and continuously withdrawing a portion of the hot H₂S gas from its recycling path.

4. The method as set forth in claim 3, wherein a portion of the flow of the natural gas from the adsorption zones is continuously diverted for use as the purging medium and wherein the flow of the purging medium after its passage through the purging zones is continuously directed back into the flow of the natural gas on its way to the adsorption zones.

5. In the removal and recovery of H₂S from natural gas containing H₂S involving the contact of adsorbent material with the natural gas from which water vapor and condensable hydrocarbons have previously been removed therefrom with resultant adsorption of the H₂S by the adsorbent material and the subsequent treatment of the adsorbent material with a heated medium to vaporize and remove the H₂S and thereby reactivate the adsorbent material for further contact with the natural gas, the improvement which comprises providing at least one bed of adsorbent material in each of a plurality of zones; continuously heating and recycling a flow of a gas consisting substantially of H₂S under high pressure through at least one of said zones to remove the H₂S contained in the adsorbent material therein and reactivate the adsorbent material; continuously directing the flow of a purging medium under high pressure through at least an additional one of said zones to purge the adsorbent material therein by removing all of the H₂S gas therefrom; directing a continuous flow of the natural gas so that it will make a first passage through at least an additional one of said zones and a second passage through the remainder of said zones so that the H₂S content of the gas will be adsorbed by the adsorbent material therein; periodically shifting the relative positions of the particular adsorbent material and the particular flow of fluid in each of said zones so that each zone becomes, in succession, a reactivation zone, a purging zone and an adsorption zone; and continuously withdrawing a portion of the hot H₂S from its recycling path.

6. The method as set forth in claim 5, wherein a portion of the flow of the natural gas from the last passage through the adsorption zones is continuously diverted for use as the purging medium and wherein the flow of the purging medium after its passage through the purging zones is continuously directed back into the flow of the natural gas on its way to make its first passage through the adsorption zones.

7. In the removal and recovery of H₂S from natural gas containing H₂S involving the contact of adsorbent material with the natural gas from which water vapor and condensable hydrocarbons have previously been removed therefrom with resultant adsorption of the H₂S by the adsorbent material and the subsequent treatment of the adsorbent material with a heated medium to vaporize and remove the H₂S and thereby reactivate the adsorbent material for further contact with the natural gas, the improvement which comprises providing at least one bed of adsorbent material in each zone of a plurality of groups of zones; continuously heating and recycling a flow of a gas consisting substantially of H₂S under high pressure through all of the zones of one group of said groups of zones to remove the adsorbed H₂S contained in the adsorbent material therein and reactivate the adsorbent material; continuously directing the flow of a purging medium under high pressure through all of the zones of another group of said groups of zones to purge the adsorbent material therein by removing all of the remaining H₂S therefrom; continuously directing the flow of natural gas under high pressure in succession and in series through the remaining groups of said groups of zones so that the H₂S content of the gas will be adsorbed by the adsorbent material therein; redirecting the flows of the dry natural gas, the flow of the H₂S activation gas and the flow of the purging medium through said groups of zones by shifting the flow passages by a simultaneous rotary movement of the gas paths so that the trailing zone, in the direction of rotation, in each group will be transferred to the adjacent following group of zones, whereby each zone will become, in succession, a reactivation zone, a purging zone and an adsorption zone; and continuously withdrawing a portion of the H₂S gas from its recycling path for future use.

8. The method as set forth in claim 7, wherein a portion of the flow of the natural gas from the adsorption zones is continuously diverted for use as the purging medium and wherein the flow of the purging medium after its passage through the purging zones is continuously directed back into the flow of the natural gas on its way to make its first passage through the adsorption zone.

References Cited in the file of this patent

UNITED STATES PATENTS

| Number | Name | Date |
|---|---|---|
| 1,998,774 | Bulkeley | Apr. 23, 1935 |
| 2,053,159 | Miller | Sept. 1, 1936 |
| 2,169,379 | Barkholt | Aug. 15, 1939 |
| 2,507,608 | Miller | May 16, 1950 |

OTHER REFERENCES

Morgan: "American Gas Practice," volume 1, 1931, pages 52–53.